(12) United States Patent
Koga et al.

(10) Patent No.: US 6,347,778 B1
(45) Date of Patent: Feb. 19, 2002

(54) VERTICAL SEAT POSITIONING DEVICE

(75) Inventors: Yoshitaka Koga, Chiryu; Naoyuki Uryu, Anjo, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/672,504

(22) Filed: Sep. 29, 2000

(30) Foreign Application Priority Data

Sep. 29, 1999 (JP) .......................................... 11-276670

(51) Int. Cl.$^7$ .............................. B60N 2/12; B60N 2/16
(52) U.S. Cl. .................. 248/421; 248/429; 297/344.13; 297/344.17
(58) Field of Search ................................ 248/419, 421, 248/424, 429; 297/344.12, 344.13, 344.15, 344.17; 296/65.02, 65.05

(56) References Cited

U.S. PATENT DOCUMENTS

| | | | | |
|---|---|---|---|---|
| 4,067,533 A | * | 1/1978 | Kazakao et al. | ............ 248/397 |
| 4,779,832 A | * | 10/1988 | Rees | ......................... 248/421 |
| 5,782,533 A | | 7/1998 | Fischer et al. | |
| 5,882,061 A | * | 3/1999 | Guillouet | ................ 296/65.05 |

FOREIGN PATENT DOCUMENTS

| | | |
|---|---|---|
| DE | 40 08 662 A1 | 9/1991 |
| DE | 44 08 219 | 9/1996 |
| EP | 0 445 528 B1 | 9/1993 |
| EP | 697 00 026 T2 | 4/1999 |

* cited by examiner

*Primary Examiner*—Anita King
*Assistant Examiner*—Jon A. Szumny
(74) *Attorney, Agent, or Firm*—Burns, Doane, Swecker & Mathis, LLP

(57) ABSTRACT

A seat vertical positioning device for a vehicle seat includes a seat side member supported by the vehicle seat, a bracket fixed to a vehicle floor side member and a link having on end pivotally connected with the bracket at a first pivot point and another end pivotally connected with the seat side member at a second pivot point. The seat vertical positioning device further includes a pin for moving the first pivot point of the link relative to the bracket when the seat side member receives a load which exceeds a predetermined value. A plurality of recesses are formed on the bracket at a position separated from the first pivot point, and a lock pin is fixed to the link and engageable with the recesses when the pivot point of the link is moved.

16 Claims, 4 Drawing Sheets

VERTICAL SEAT POSITIONING DEVICE

This application is based on and claims priority under 35 U.S.C. § 119 with respect to Japanese Application No. 11(1999)-276670 filed on Sep. 29, 1999, the entire content of which is incorporated herein by reference.

FIELD OF THE INVENTION

The present invention generally relates to vehicle seats. More particularly, the present invention pertains to a vertical seat positioning control device for a vehicle seat assembly.

BACKGROUND OF THE INVENTION

German Patent Application DE-44 08 219 discloses a seat device for a vehicle seat assembly that includes a stopper mechanism for a vertical positioning device. The vertical positioning device engages a seat side member at its one side and engages an upper rail of the seat slide device at its other end through the stopper mechanism at the uppermost adjusting position. A seat belt is fixed to the seat side member for assuring the optimized restrained position for a seated occupant of the vehicle, regardless of any seat adjusting position in the front and rear directions.

With this known vertical positioning device, when the seat is used at the lowermost vertical position and receives an excessive load exceeding its mechanism load capacity and transmitted from the seat belt device through the seat side member, the seat side member is moved by the load from the lowermost position to the uppermost position and engages the upper stopper. The seat side member is accelerated during this up word movement, and upon the seat side member reaching the upper stopper, the vertical positioning device and the seat side member receive a greatly increased or magnified load. This thus requires a construction that is strong enough to endure this increased or magnified load.

SUMMARY OF THE INVENTION

According to the present invention, a seat vertical positioning device for a vehicle seat includes a seat side member supported by the vehicle seat, a bracket fixed to a vehicle floor side member and a link having on end pivotally connected with the bracket at a first pivot point and another end pivotally connected with the seat side member at a second pivot point. The seat vertical positioning device further includes a pin for moving the first pivot point of the link relative to the bracket when the seat side member receives a load which exceeds a predetermined value. A plurality of recesses are formed on the bracket at a position separated from the first pivot point, and a lock pin is fixed to the link and engageable with the recesses when the pivot point of the link is moved.

With this construction, upon application of an excessive load to the vertical positioning device from a seat belt device, the vertical positioning device engages one of the recesses within the height adjusting area for receiving such load. Thus, the vertical positioning device can be structured without having any heavy or large structure for receiving a larger load from the seat belt.

According to another aspect of the invention, a seat vertical positioning device for a vehicle seat includes a seat side member supported by the vehicle seat, a floor side member supported on a vehicle floor, a bracket fixed to the floor side member, and a link pivotally connected to the bracket by a first pin passing through respective first holes in the bracket and the link to permit the link to rotate relative to the bracket. The link is also pivotally connected to the seat side member A lock pin passes through respective second holes in the bracket and the link, with the first hole in the bracket being larger than the first hole in the link and the second hole in the bracket being larger than the second hole in the link so that in addition to rotating relative to the bracket, the link is adapted to shift relative to the bracket when the seat side member receives a load exceeding a predetermined value.

A seat vertical positioning device for a vehicle seat according to another aspect of the invention includes a seat side member for supporting the vehicle seat, a floor side member adapted to be supported on a vehicle floor, a bracket fixed to the floor side member, a link pivotally connected to the bracket by a first pin passing through a hole in the link and an elongated hole in the bracket to permit the link to rotate relative to the bracket about a pivot point during vertical adjustment of the vehicle seat while also permitting the link to shift relative to the bracket to move the pivot point when the seat side member receives a load exceeding a predetermined value. The link is also pivotally connected to the seat side member by a second pin. A lock pin is fixed to the link and movable with respect to the bracket to engage a portion of the bracket when the seat side member receives a load exceeding a predetermined value.

BRIEF DESCRIPTION OF THE DRAWING FIGURES

A more complete appreciation of the invention and other advantages thereof will be readily obtained as the same becomes better understood by reference to the following detailed description when considered in connection with the accompanying drawings, wherein.

DETAILED DESCRIPTION OF THE INVENTION

Figure 1:
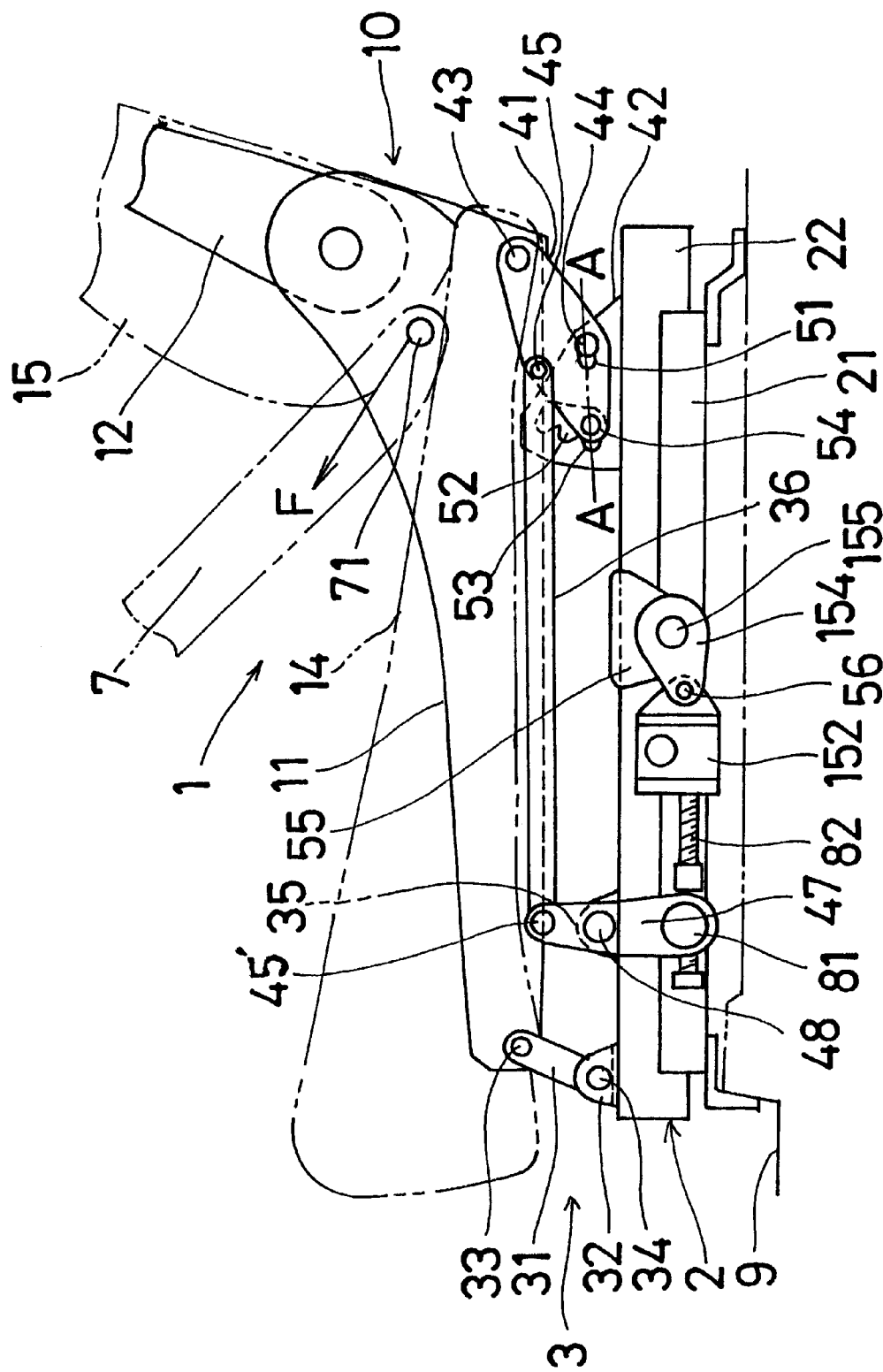
FIG. 1 is a side view of a seat vertical positioning device applied to a vehicle seat device according to the present invention.
Figure 2:
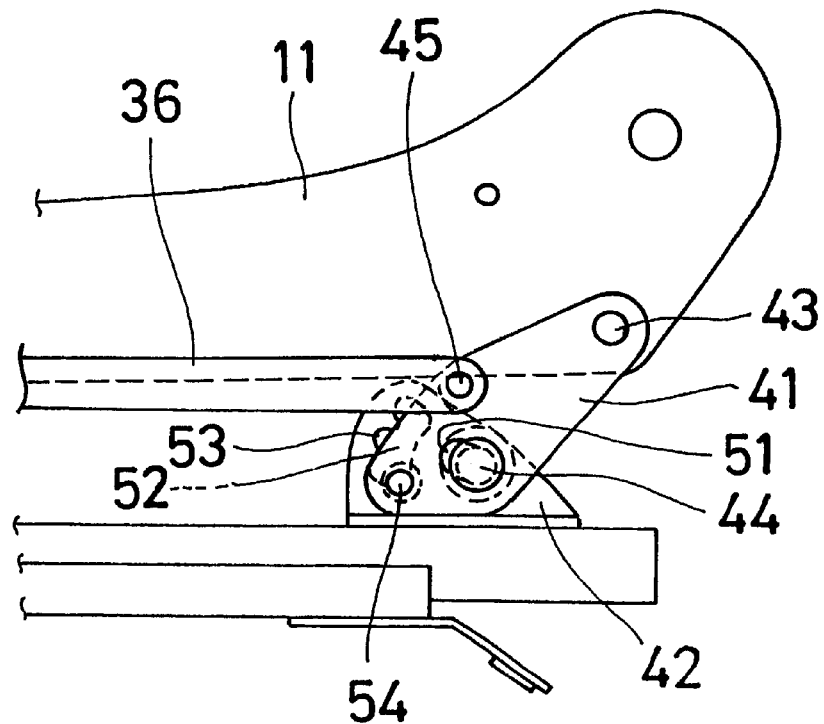
FIG. 2 is a side view of a portion of the seat vertical positioning device shown in FIG. 1 positioned at an uppermost position.
Figure 3:
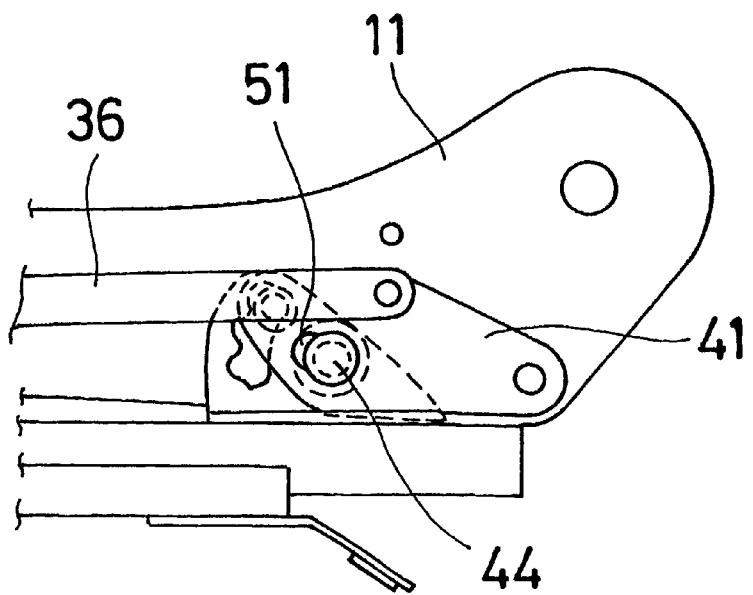
FIG. 3 is a side view of a portion of the seat vertical positioning device shown in FIG. 1 positioned at a lowermost position.

Referring initially to FIG. 1, the seat vertical positioning device of the present invention includes a vehicle seat 1 and a seat slide device 2 for adjusting the position of the vehicle seat 1 forward and rearward with respect to the vehicle extent. The vehicle seat 1 includes a seat cushion 14 and a seat back 15. The seat slide device 2 is fixed to the vehicle floor 9.

A seat reclining device 10 for adjusting the angular position of the seat back 15 is provided on the seat 1. The seat reclining device 10 includes a lower arm 11 for supporting the seat cushion 14 of the seat 1 and the seat slide device 2 includes an upper rail 22 which is movable in the front and rear directions of the vehicle.

A seat vertical adjusting device 3 for adjusting the vertical position of the seat is disposed between the upper rail 22 of the seat slide device 2 and the lower arm 11 of the seat reclining device 10. The upper rail 22 constitutes a floor side member while the lower arm 11 constitutes a seat side member.

A seat belt 7, a portion of which is shown in FIG. 1, is fixed to the lower arm 11 of the seat reclining device 10 at a seat belt attaching portion 71 for optimizing the restraining performance of the seat belt 7. The attaching portion 71 position is fixed with respect to the seat occupant, regardless of the seat position in the front and rear directions.

Considering the attachment of the seat vertical device 3 to the vehicle seat, a front bracket 32 is fixed to the front end of the upper surface of the upper rail 22 of the seat slide device 2 while a rear bracket 42 is fixed to the rear end of the upper surface of the upper rail 22. The seat vertical device 3 includes a front link 31 having one end pivotally mounted on the front bracket 32 with a pin 34 and an opposite end pivotally mounted on the lower arm 11 of the seat reclining device 10 with a pin 33. In addition, the lower end of a rear link 41 is pivotally mounted on the rear bracket 42 with a pivot pin 44. The rear link 41 is also pivotally mounted on the lower arm 11 with a pin 43. The rear end portion of a connecting link 36 is connected to the rear link 41 with a pin 45 for transmitting rotational movement to the rear link 41 for adjusting the vertical position of the seat 1. The connecting link 36 extends forwardly in the horizontal direction and has a front end connected to an upper end of a vertically extending lever 47 at a pin 45'.

The middle portion of the lever 47 is pivotally mounted on a bracket 35 by way of a pin 48. The bracket 35 is fixed on the upper rail 22 of the seat slide device 2. The lower end of the lever 47 rotatably engages a screw nut 81 which is in meshing gear engagement with a screw rod 82. The screw rod 82 is rotated by a motor and a reduction gear mechanism 152. The motor and reduction gear mechanism 152 is pivotally mounted on a bracket 55 secured to the upper rail 22 through a pin 56, a lever 154, and another pin 155.

When the motor is driven, the screw rod 82 is rotated to move the screw nut 81 in the forward and rearward directions (i.e., in the left and right directions as viewed in FIG. 1). This movement of the screw nut 81 rotates the lever 47 and at the same time moves the connecting link 36 in the front and rear direction. This will swing the rear link 41 to adjust the height of the seat 1 through the lower arm 11 which supports the seat cushion 14.

Figure 5:
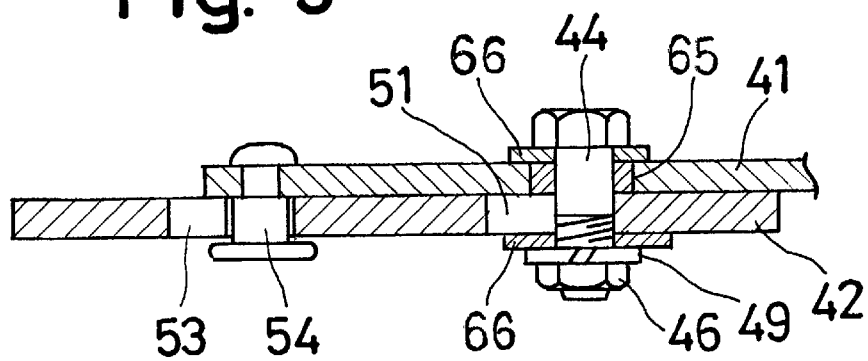
FIG. 5 is a cross-sectional view taken along the section line IV—IV of FIG. 1.
Figure 7:
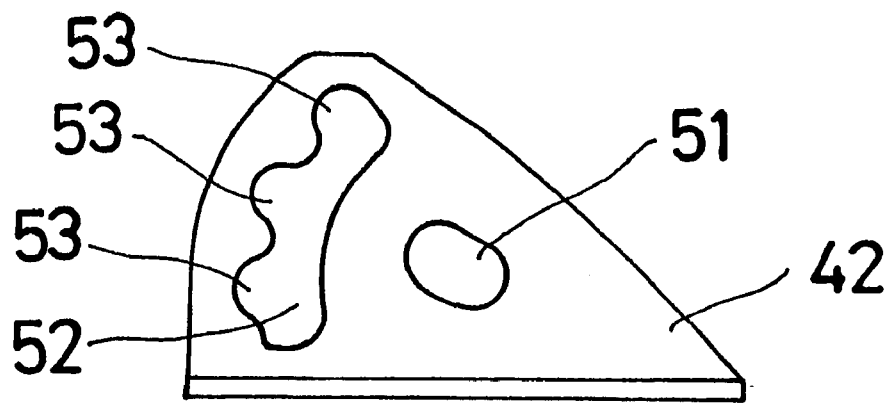
FIG. 7 is a plan view of a rear bracket used in the seat vertical positioning device of the present invention.

As shown in FIGS. 5 and 7, the rear bracket 42 includes a first elongated hole 51 which is slightly upwardly inclined or oriented, but is otherwise a basically horizontal slot. As shown in FIG. 5, the pivot pin 44 engages the rear link 41 through a bush 65. The pivot pin 44 passes through a nut 46, washers 66, 66 and a spring washer 49 at the rear side (i.e., the bottom side as viewed in FIG. 5) of the elongated hole 51.

As shown in FIG. 7, the rear link 41 further includes a second elongated arc shaped hole 52 spaced from the pivot pin 44 in the forward direction. A plurality of generally rounded recesses 53 are formed at the front side of the inner periphery of the second elongated hole 52 as best shown in FIG. 7. A pin 54 is positioned in the second elongated hole 52 and is secured to the rear link 41. The pin 44 is secured in the rear side of the first elongated hole 51 under normal use of the seat vertical positioning function as shown in FIG. 5.

The stopper of the seat vertical positioning device normally functions to restrict the vertical positioning device to its uppermost and lowermost positions. However, when an excess load F, exceeding a predetermined value of the load applied to the vertical positioning device 3, is applied from the attaching point 71 of the seat belt 7 as seen in FIG. 1, the lower arm 11 to which the seat belt 7 is attached is pulled in the forward and upward directions relative to the upper rail 22 as shown in FIG. 1. When such pulling force is applied to the lower arm 11, the connecting link 36 is bent by virtue of receiving a large compression force, and the pivot pin 44 in the elongated hole 51 of the rear bracket 42 is moved to the forward portion of the hole 51. Thus the pin or lock pin 54 engages one of the recesses 53 to stop the rotational movement of the rear link 41, and the load pulling the lower arm 11 in the upward and forward direction will be transmitted to the upper rail 22 through the rear bracket 42.

Figure 4:
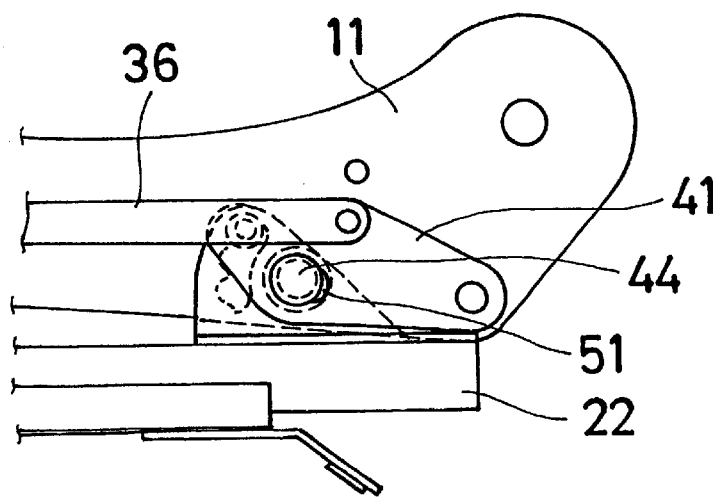
FIG. 4 is a side view of a portion of the seat vertical positioning device shown in FIG. 1 when an excess load is applied from a seat belt to a lower arm.

As shown in FIG. 4, even when the vertical positioning device is at its lowest position and receives the excessive load through the seat belt, the upward movement of the lower arm 11 can be prevented instantly or substantially instantly by the engagement of the pin or lock pin 54 with the lowest recesses 53 in the rear bracket 42. The differently positioned recesses 53 allow the transfer of load when the vertical positioning device is located at different positions. Because the lower arm 11 is stopped without being substantially moved, the vertical positioning device and the seat members do not receive any magnified load.

Figure 6:
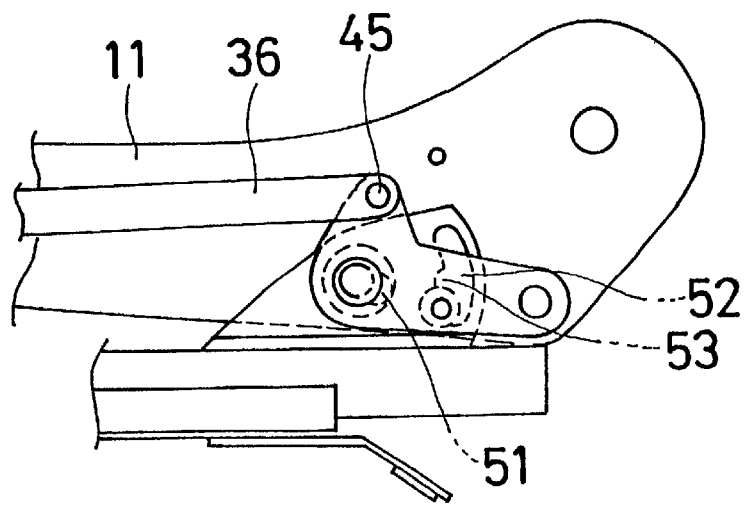
FIG. 6 is a side view of another embodiment of the seat vertical positioning device according to the present invention.

FIG. 6 shows another version of the rear bracket used in the present invention in which the positions of the first and second elongated holes 51, 52 are switched from that shown in the version of the rear bracket 42 shown in FIGS. 4 and 5. Thus, the second elongated hole 52 is located forward of the first elongated hole 51.

Figure 8:
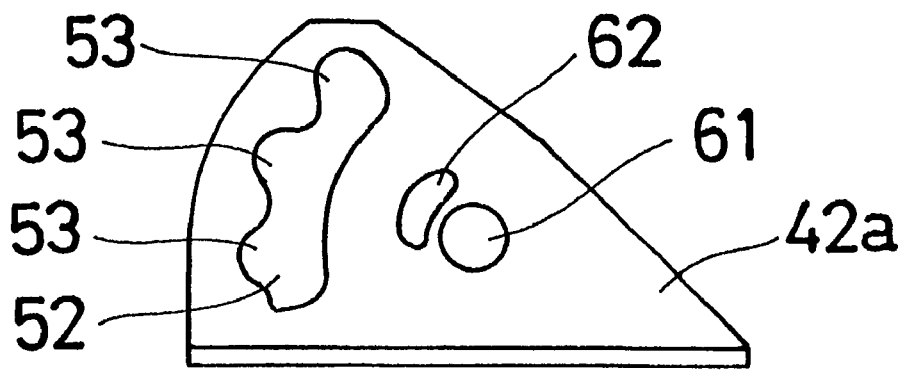
FIG. 8 is a plan view of another embodiment of the rear bracket used in the seat vertical positioning device of the present invention.

In accordance with another aspect of the invention shown in FIG. 8, in addition to the first pivot hole 61 (corresponding to the first hole 51 described above), another hole 62 may be provided as long as the structure allows the pivot point to be movable in case any excessive load is applied. The rear bracket 42a may be plastically deformed upon an excessive load being applied thereto.

The present invention thus provides an improved seat vertical positioning device for a vehicle seat. The seat vertical positioning device inhibits or prevents application of excessive or magnified loads to the device, while at the same time maintaining a relatively lightweight structure.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claimed is:

1. A seat vertical positioning device for a vehicle seat comprising:

a seat side member supported by the vehicle seat;

a floor side member supported on a vehicle floor;

a bracket fixed to the floor side member;

a link having one end pivotally connected with the bracket at a first pivot point and another end connected with the seat side member at a second pivot point;

a pin for moving the first pivot point of the link relative to the bracket when the seat side member receives a load which exceeds a predetermined value;

a plurality of recesses formed on the bracket at a position separated from a pivot center of the pin; and a lock pin fixed to the link and engageable with one of the recesses when the pin is moved.

2. The seat vertical positioning device according to claim 1, wherein the bracket has an elongated hole in which the pin is positioned to allow the first pivot point to move when the seat side member receives a load exceeding the predetermined value.

3. The seat vertical positioning device according to claim 1, wherein the bracket has a first hole in which is positioned the pin and another hole adjacent the first hole to allow the first pivot point to move when the seat side member receives a load exceeding the predetermined value.

4. The seat vertical positioning device according to claim 3, wherein the first hole is positioned forward of the another hole.

5. The seat vertical positioning device according to claim 3, wherein the another hole is positioned forward of the first hole.

6. A seat vertical positioning device for a vehicle seat comprising:

a seat side member supported by the vehicle seat;

a floor side member supported on a vehicle floor;

a bracket fixed to the floor side member;

a link pivotally connected to the bracket by a first pin passing through respective first holes in the bracket and the link to permit the link to rotate relative to the bracket, the link also being pivotally connected to the seat side member;

a lock pin passing through respective second holes in the bracket and the link, the first hole in the bracket being larger than the first hole in the link and the second hole in the bracket being larger than the second hole in the link so that in addition to rotating relative to the bracket, the link is adapted to shift relative to the bracket when the seat side member receives a load exceeding a predetermined value.

7. The seat vertical positioning device according to claim 6, wherein the first hole in the bracket is an elongated hole through which the first pin extends.

8. The seat vertical positioning device according to claim 6, wherein the second hole in the bracket is an elongated hole through which the second pin extends.

9. The seat vertical positioning device according to claim 6, wherein the second hole in the bracket is an arcuate shaped hole provided with a plurality of spaced apart recesses.

10. The seat vertical positioning device according to claim 6, wherein the first hole in the bracket is positioned forward of the second hole in the bracket.

11. The seat vertical positioning device according to claim 6, wherein the second hole in the bracket is positioned forward of the first hole in the bracket.

12. A seat vertical positioning device for a vehicle seat comprising:

a seat side member for supporting the vehicle seat;

a floor side member adapted to be supported on a vehicle floor;

a bracket fixed to the floor side member;

a link pivotally connected to the bracket by a first pin passing through a hole in the link and an elongated hole in the bracket to permit the link to rotate relative to the bracket about a pivot point during vertical adjustment of the vehicle seat while also permitting the link to shift relative to the bracket to move said pivot point when the seat side member receives a load exceeding a predetermined value, said link also being pivotally connected to the seat side member by a second pin; and a lock pin fixed to the link and movable with respect to the bracket to engage a portion of the bracket when the seat side member receives a load exceeding a predetermined value.

13. The seat vertical positioning device according to claim 12, wherein said elongated hole in the bracket is a first hole, the lock pin passing through an elongated second hole in the bracket which possesses a plurality of spaced apart recesses.

14. The seat vertical positioning device according to claim 13, wherein the first hole in the bracket is positioned forward of the second hole in the bracket.

15. The seat vertical positioning device according to claim 13, wherein the second hole in the bracket is positioned forward of the first hole in the bracket.

16. The seat vertical positioning device according to claim 12, wherein said link is a rear link, and including a connecting link connected to the rear link by a pin.

* * * * *